(12) United States Patent
Torrent et al.

(10) Patent No.: US 10,635,368 B2
(45) Date of Patent: Apr. 28, 2020

(54) MANAGEMENT OF 3D PRINTING

(71) Applicants: HEWLETT-PACKARD DEVELOPMENT COMPANY, L.P., Houston, TX (US); Anna Torrent, Sant Cugat del Valles (ES); Juan Manuel Zamorano, Sant Cugat del Valles (ES)

(72) Inventors: Anna Torrent, Sant Cugat del Valles (ES); Marina Ferran Farras, Vancouver, WA (US); Juan Manuel Zamorano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/096,355

(22) PCT Filed: Jun. 28, 2016

(86) PCT No.: PCT/EP2016/064933
§ 371 (c)(1),
(2) Date: Oct. 25, 2018

(87) PCT Pub. No.: WO2018/001454
PCT Pub. Date: Jan. 4, 2018

(65) Prior Publication Data
US 2019/0286384 A1    Sep. 19, 2019

(51) Int. Cl.
*G06F 3/12* (2006.01)
*B33Y 10/00* (2015.01)
(Continued)

(52) U.S. Cl.
CPC .............. *G06F 3/126* (2013.01); *B28B 1/001* (2013.01); *B28B 17/0081* (2013.01);
(Continued)

(58) Field of Classification Search
None
See application file for complete search history.

(56) References Cited

U.S. PATENT DOCUMENTS 5,622,577 A    4/1997   O'Connor
7,621,733 B2   11/2009  Reynolds et al.
(Continued)

FOREIGN PATENT DOCUMENTS

JP    2013049137    3/2013
JP    2013067018    4/2013
WO    WO-2016085334 6/2016

OTHER PUBLICATIONS

"HP Jet Fusion 3D Printing Solution—Reinventing Prototyping and Manufacturing"; May 17, 2016; http://magicbulletmedia.com/MNR/HPJetFusion3DPrinting/documents/4AA6-4894ENA-P.pdf.

*Primary Examiner* — Dung D Tran
(74) *Attorney, Agent, or Firm* — HP Inc. Patent Department (57) ABSTRACT

Management system to control a 3D printing system that includes at least one 3D printer, at least one build unit in which 3D objects can be generated by the 3D printer, and at least one material processing unit in which processing operations can be performed on the build unit. The management system comprises a processor to obtain status data from at least some of the elements of the 3D printing system, to obtain data relating to a print job to be printed, to determine, from the obtained data, a schedule of operations to be performed by elements of the 3D printing system and to generate control data to allow enforcement of the determined schedule.

20 Claims, 7 Drawing Sheets

(51) Int. Cl.

| | |
|---|---|
| *B33Y 50/02* | (2015.01) |
| *B29C 64/153* | (2017.01) |
| *B29C 64/393* | (2017.01) |
| *B28B 1/00* | (2006.01) |
| *B28B 17/00* | (2006.01) |
| *G05B 19/418* | (2006.01) |
| *B29C 64/386* | (2017.01) |
| *B33Y 50/00* | (2015.01) |
| *B29C 64/20* | (2017.01) |
| *B33Y 30/00* | (2015.01) |
| *B22F 3/105* | (2006.01) |

(52) U.S. Cl.
CPC ............ *B29C 64/153* (2017.08); *B29C 64/20* (2017.08); *B29C 64/386* (2017.08); *B29C 64/393* (2017.08); *B33Y 10/00* (2014.12); *B33Y 50/00* (2014.12); *B33Y 50/02* (2014.12); *G05B 19/41865* (2013.01); *G06F 3/1203* (2013.01); *G06F 3/1211* (2013.01); *G06F 3/1229* (2013.01); *B22F 3/1055* (2013.01); *B22F 2003/1057* (2013.01); *B33Y 30/00* (2014.12); *G05B 2219/49023* (2013.01); *Y02P 90/20* (2015.11)

(56) References Cited

U.S. PATENT DOCUMENTS

| | | | |
|---|---|---|---|
| 8,137,609 B2 | 3/2012 | McAlea et al. | |
| 8,185,229 B2 | 5/2012 | Davidson | |
| 9,022,770 B2 | 5/2015 | Pettis | |
| 10,052,822 B1* | 8/2018 | Sait | B29C 64/386 |
| 2005/0116391 A1 | 6/2005 | Lindemann et al. | |
| 2006/0219671 A1 | 10/2006 | Merot et al. | |
| 2012/0287470 A1* | 11/2012 | Pettis | G06F 3/12 358/1.15 |
| 2016/0082652 A1 | 3/2016 | Snyder | |
| 2016/0221100 A1* | 8/2016 | Fisser | B23K 9/04 |
| 2017/0261965 A1* | 9/2017 | Shiihara | G05B 19/4099 |
| 2019/0118477 A1* | 4/2019 | Fornos | B33Y 50/02 |

* cited by examiner

MANAGEMENT OF 3D PRINTING

Additive manufacturing systems, generally referred to as 3D printing systems, may be useful in generating generally low quantities of certain types of objects. At present, traditional manufacturing techniques, such as injection molding, may be considered to be more efficient for generating large quantities of certain types of objects.

BRIEF DESCRIPTION

Examples will now be described, by way of non-limiting example only, with reference to the accompanying drawings, in which.

DETAILED DESCRIPTION

As the availability of high-speed and high quality 3D printing systems increases, so does the prospect of 3D printers replacing at least some traditional manufacturing techniques. However, in order to drive the large-scale adoption of 3D printing in the industrial manufacturing space the competitivity of such 3D printing systems has to be increased.

An example 3D printing system was announced by HP Inc. on May 17, 2016. The announced 3D printing system comprises a 3D printer, a build unit, and a material processing unit. The build unit is the module in which the 3D printer generates 3D objects using build material stored in the build unit. The material within the build unit may be loaded in the build unit by the material processing unit. The material processing unit also serves to remove unfused material from the build unit after processing by the 3D printer and also allows finished 3D printed articles to be removed. Unfused material may be recovered by the material processing unit to be reused to generate further 3D objects.

Due to its modular nature, the above-mentioned 3D printing system may be used in a variety of configurations, from small prototyping environments, to high production capacity industrial environments.

Described herein are examples of a 3D printing management system to help increase the throughput capacity of such 3D printing systems. Such a management system will be of particular use in configurations where multiple elements, such as multiple build units, multiple 3D printers, and/or multiple material processing units are used.

Figure 1:
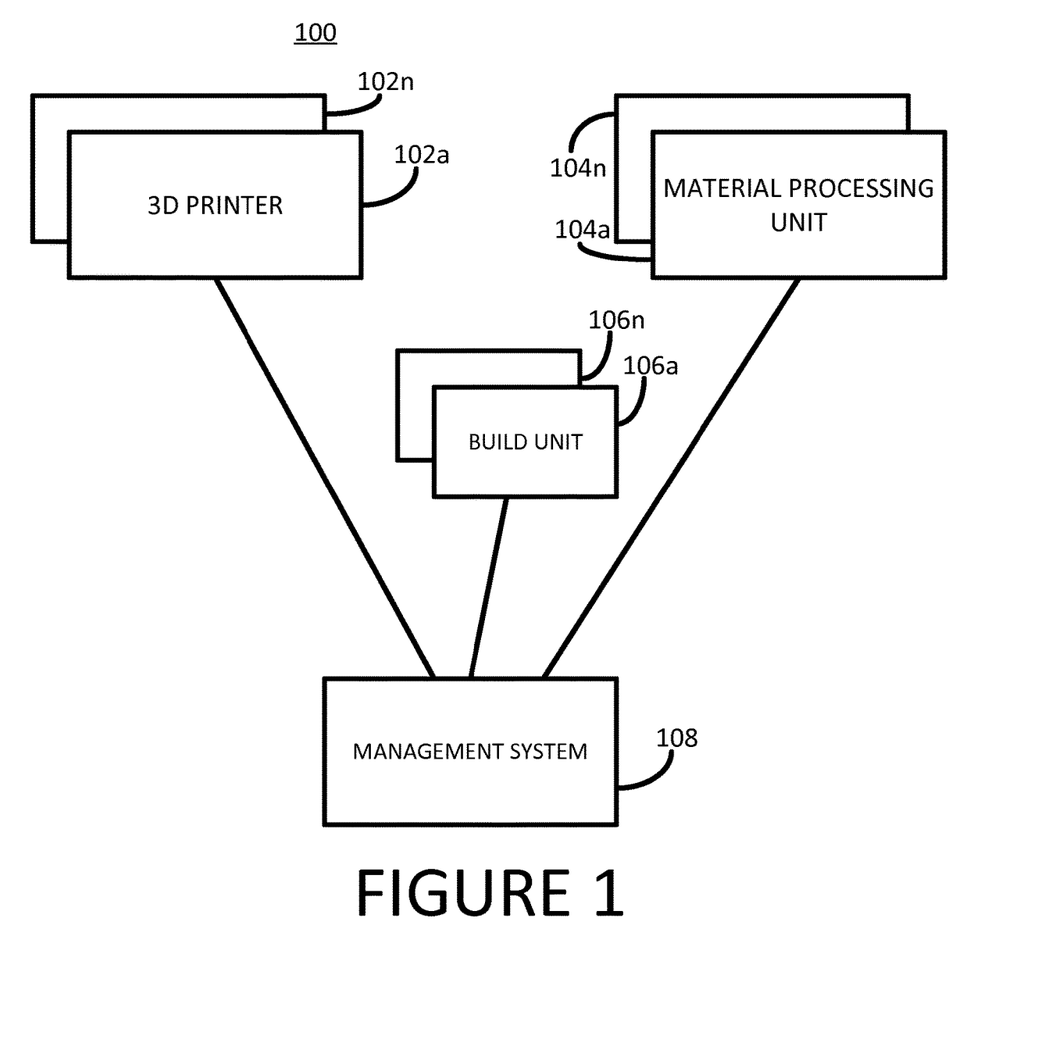
FIG. 1 is a block diagram of a 3D printing system according to one example.

Referring now to FIG. 1, there is shown a 3D printing system 100 according to one example. The 3D printing system 100 comprises one or multiple 3D printers 102a to 102n, one or multiple material processing units 104a to 104n, one or multiple build units 106a to 106n, and a management system 108.

The three above-described elements of the 3D printing system, i.e. the 3D printer, the build unit, and the material processing unit, are independent elements. By independent elements is meant that there may be no physical connection between each of the elements. In examples there may be no direct communication possible between each of the elements.

Figure 2:
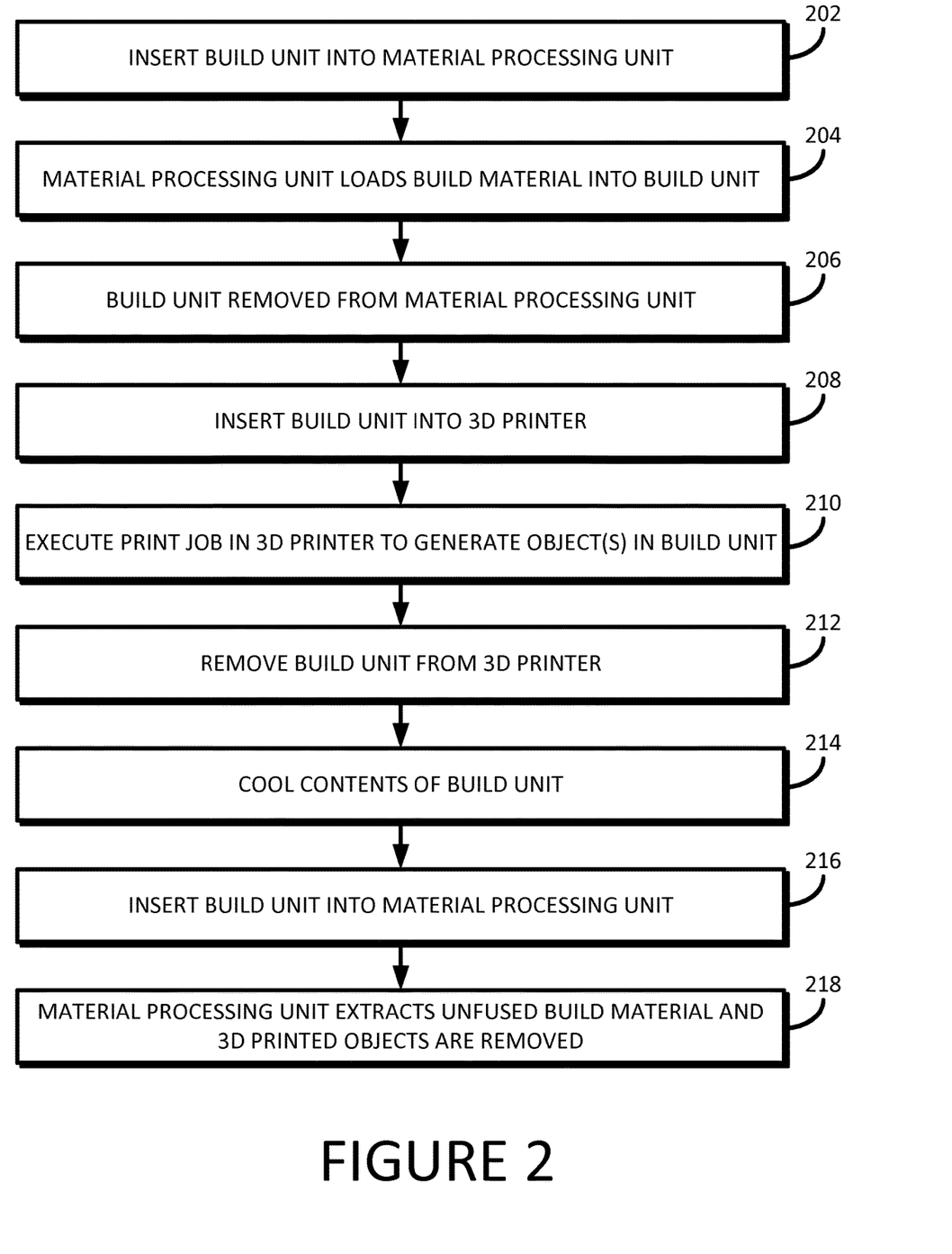
FIG. 2 is a flow diagram outlining an example workflow according to which a 3D printing system may be operated.

An example workflow of how the 3D printing system 100 may be operated is described below with additional reference to FIG. 2. In this example only a single 3D printer, a single build unit, and a single material processing unit are described.

At 202 an empty build unit 106 is inserted into the material processing unit 104.

At 204 the material processing unit 104 loads build material into the build unit 106. The material processing unit 104 would have been previously supplied with a suitable build material, for example from one or multiple build material containers. Build material may be any suitable build material that is suitable for processing by the 3D printing system. In one example, the build material may be a powdered thermoplastic material, such as PA11 or PA12. In other examples powdered metals, powdered ceramics, and other suitable powdered build materials may be used.

The 3D printer 102 may be able to generate 3D objects in a build unit loaded with different kinds of build material (e.g. with each build unit loaded with a single kind of build material at any one time). The material processing unit 104 may also be used to process different kinds of build material, but in one example may only process a single kind of build material at one time, to avoid contamination between different kinds of build material.

At 206 the build unit 106 is removed from the material processing unit 104.

At 208 the build unit 106 is inserted into the 3D printer 102.

At 210 the 3D printer 102 executes a print job to generate an object or objects in the build unit.

At 212, when the print job has been executed, the build unit 106 is removed from the 3D printer.

At 214, the contents of the build unit 106 may be allowed to cool, for example using natural cooling. In some examples, however, the natural cooling phase may be omitted, and in other examples the natural cooling phase may be used to reduce the temperature of the contents of the build unit by a predetermined amount, for example between about 5 and 20%, between about 5 and 50%, or between about 5 and 95%.

At 216 the build unit is inserted into the material processing unit.

At 218 the material processing unit is used to extract unfused build material from the build unit and to allow the 3D printed objects in the build unit to be removed.

The build unit 106 is a mobile unit that may be moved between the 3D printer 102 and the material processing station 104. At present, the build unit 106 may be moved manually by a user, although known automation systems, such as powered robots, could also be used to automatically move the build unit.

In a 3D printing system with just a single build unit 106, a single 3D printer 102, and a single material processing unit 104, control of the workflow is relatively straightforward.

With a single build unit 106, either the 3D printer 102 or the material processing unit 104 may be idle whilst the build unit 106 is inserted into either the 3D printer 102 or the material processing unit 104. If a 3D print job takes, for example, between 5 to 10 hours to complete by the 3D printer 102 (depending, for example, on the size of the build volume in the build unit), this can lead to a large amount of idle time for the material processing unit 104. Similarly, if it takes 1 hour, for example, to process the build unit 106 in the material processing unit 104, the 3D printer 102 is idle during this time.

Adding multiple build units 106 to the 3D printing system 100 enables production capacity to be increased since, for example, one build unit can be being processed by the 3D printer 102, whilst another build unit is being processed by the material processing unit 104. Adding further build units 106 enables further capacity increases and helps reduces idle time of elements of the 3D printing system.

Adding multiple 3D printers 102 and multiple build units 106 to the 3D printing system 100 enables production capacity to be further increased by allowing, for example, multiple build units to each be processed by a different 3D printers at the same time.

Adding multiple material processing units 104, multiple 3D printers 102, and multiple build units 106 to the 3D printing system 100 enables production capacity to be yet further increased. In this way, each material processing unit 104 may, for example, be used with a different kind of build material, which further increases the attractiveness of such 3D printing systems.

However, adding additional elements to the 3D printing system 100 increases the complexity of managing workflow. It may also increase the likelihood of errors being made, for example, by inserting a build unit loaded with a first kind of build material into a material processing unit using a different kind of build material. Furthermore, having multiple identical or similar looking build units having different states of operation (such as: having being loaded with build material; having been processed by a 3D printer; at different stages of natural cooling; awaiting processing by a material processing unit; etc.) further complicates workflow management.

Figure 3:
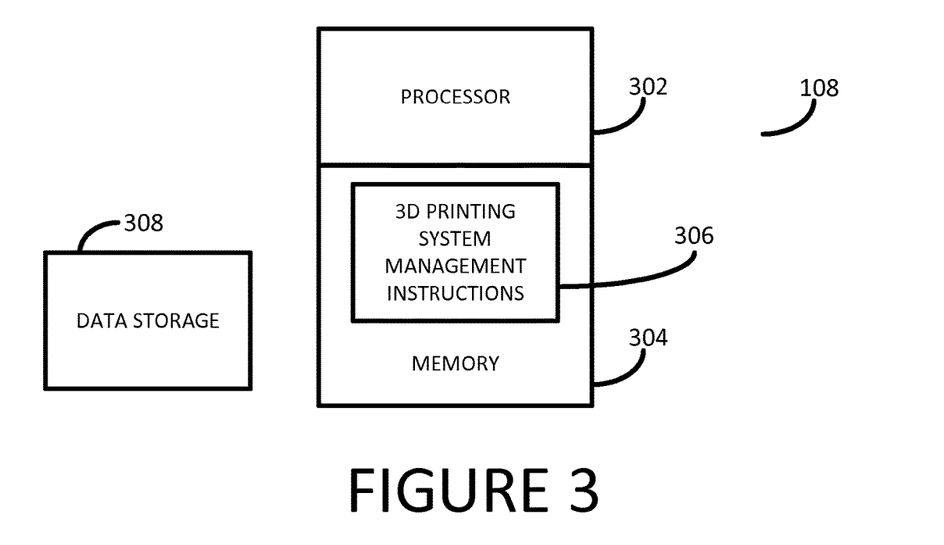
FIG. 3 is a block diagram of a 3D printing management system according to one example.

As described below and as shown in more detail in FIG. 3, the management system 108 aims to simplify workflow management within the printing system 100. The management system 108 may also allow the 3D printing system to be operated at a high level of efficiency. The management system 108 comprises a processor 302, such as a microprocessor. The processor 302 is coupled to a memory 304, for example via a suitable communication bus (not shown). The memory 304 stores processor understandable 3D printing system management instructions 306 that when executed by the processor 302 cause the processor 302 to control elements of the 3D printing system 100 as described in detail below. It will be appreciated that the management system 108 may also comprise additional elements such as user interfaces, visual display units, power supplies, and the like, which are not illustrated for the purposes of clarity.

The management system 108 also comprises storage 308 for storing data related to the status of different ones of the elements of the 3D printing system 100. In one example the storage may be part of the memory 304 within the management system 108. In another example the storage 308 may be part of a separate storage or database that is accessible to the management system 108 via a suitable communications network. For example, the storage 308 could be located within the 3D printing system 100, or could be located remotely and accessible via the Internet or other communications network.

An example operation of the 3D printing system 100 will now be described with reference to the flow diagram of FIG. 4.

At block 402 the processor 302 of the management system 108 executes instructions 306 to obtain status data from at least some of the elements of the 3D printing system 100.

As will be appreciated, there are numerous ways in which such status data may be obtained. For example, the management system 108 may be in wired or wireless communication with elements of the 3D printing system 100 and may either directly request, or pull, the data, for example through an appropriate application programmer interface (API) or other direct polling mechanism. Such data may also be sent, or pushed, from different ones of the elements of the 3D printing system 100 directly to the management system 108. Such data may also be sent by different ones of the elements of the 3D printing system to an intermediate storage element, such as a cloud or network based storage facility, from which the management system 108 may indirectly obtain the status data. In some examples a mix of direct and indirect, and push or pull mechanisms may be used. As used herein the term 'obtain data' is intended to cover any suitable mechanism for obtaining data.

For example, in the present example the 3D printer 102 and material processing unit 104 may be connected to an local area network (LAN), or may be connected to a wide area network (WAN) such as the Internet.

The management system 108 obtains status data from the 3D printer 102. The status data may include any or all of the following non-limiting examples:
  A printer identifier;
  The operational state of the printer (e.g. printing, idle, awaiting maintenance, etc.);
  If printing, estimated end of printing time; and
  Types of build material with which the printer can operate.

The management system 108 also obtains status data from the material processing unit 104. The status data may include any or all of the non-limiting following examples:
  An identifier of the material processing unit;
  The operational state of the unit (e.g. in-use, idle, awaiting maintenance, etc.);
  If in-use, estimated end time; and
  Type of build material loaded in the material processing unit The management system 108 also obtains status data from the build unit 106. The status data may include any or all of the following non-limiting examples:
  Identifier of the build unit
  Operational state of the unit (e.g. ready for printing, inserted in printer, inserted in material processing unit, not inserted into either printer or material processing unit; undergoing cooling, etc.)
  Build material type loaded in the build unit In one example the build unit 106 uses a suitable wireless communication module to transmit and receive data. In another example, the build unit 106 has no electronic communication capability, in which case status data of the build unit 106 may be obtained, either directly or indirectly, either when the build unit 106 is inserted into either the 3D printer 102 or is inserted into the material processing unit 104. For example, the 3D printer 102 and the material processing unit 104 may send or make available data relating to the build unit 106 to the management system 108.

In another example, the status of the build unit 106 may be obtained manually, for example by a user through a suitable user interface of an appropriate computing device, who may manually enter the identifier of the build unit, or scan a barcode, RFID tag, or other suitable electronic identification means associated therewith. The status data of the build unit 106 may be manually entered on the portable computing and subsequently transmitted to the data storage 308.

At block 404 the processor 302 of the management system 108 executes instructions 306 to obtain data relating to a print job to be printed. In one example the 3D printing system 102 is configured such that print jobs to be printed by a 3D printer are initially sent to the management system 108, which in turn may transmit the print job to an appropriate 3D printer in the 3D printing system 100 in accordance with a determined schedule, for example at a determined time. In one example the management system 108 may store the print job, or a link to the print job until it is sent to a 3D printer. In another example, the 3D printing system 102 may be configured such that print jobs are sent directly to a chosen 3D printer, and metadata relating to the print job is also sent or made available to the management system 108.

The management system 108 thus also obtains data or metadata relating to a print job to be printed by a 3D printer in the 3D printing system 100. The print job data may include any or all of the following non-limiting examples:
   A print job identifier
   The build material to be used (e.g. material type, acceptable or desired ratio of fresh to recycled build material);
   The size of the build volume;
   The number of objects to be printed;
   The estimated or desired cooling time after printing;
   An urgency indicator; and
   Details of any post-processing operations to be performed.

At block 406 the management system 108 determines a schedule of operations to be performed by different ones of the elements of the 3D printing system 100.

For example, the management system 108 may determine that a given print job should be printed in a given build unit 106 in a given 3D printer 102, and that post-processing of the build unit 106 should be performed by a given material processing unit 104. In addition to determining an order of operations the management system 108 may also determine timing data related to at least some of the operations. In one example the management system 108 generates scheduling data relating to both a 3D printer and a material processing unit. For example, the management system 108 may schedule a build unit to be used in a given 3D printer during a first timeframe, and may schedule the build unit to be used in a given material processing unit in a second timeframe different from the first timeframe.

At block 408, the management system 108 determines control data to allow enforcement of the determined schedule. In one example the control data may be transmitted to at least some of the elements of the 3D printing system 100. In another example the control data may be stored in the storage 308 to which elements of the 3D printing system 100 have access. In this way, for example, a material processing unit may determine from the control data whether it can process the build unit or not at the current time.

Figure 4:
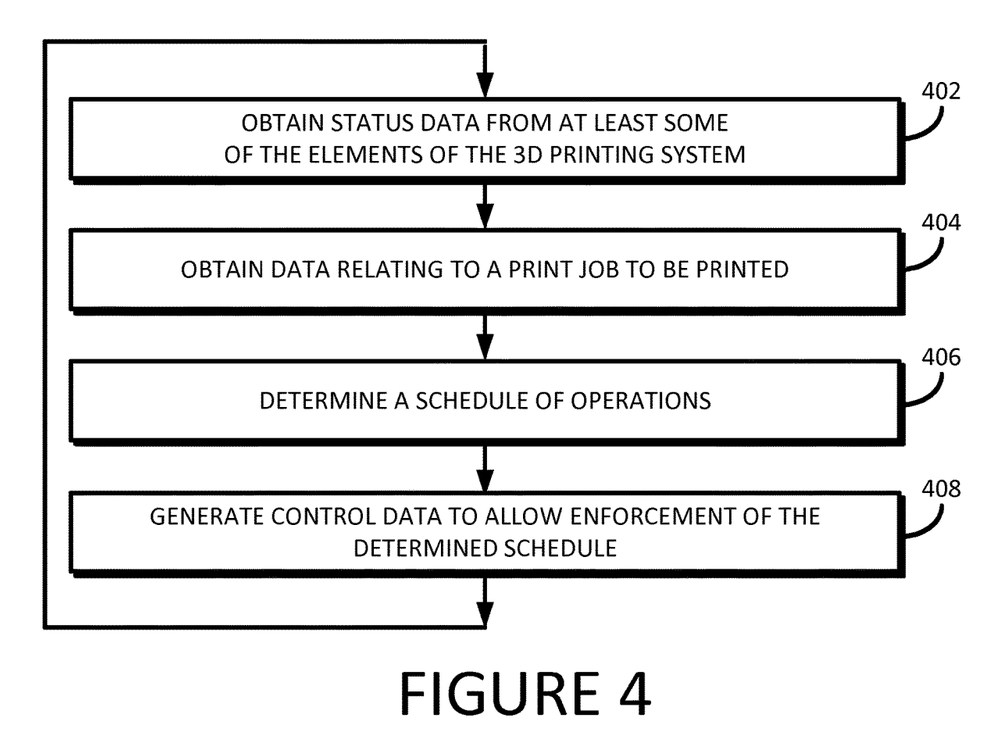
FIG. 4 is a flow diagram outlining a method of operating a 3D printing management system according to one example.

The example process outlined in FIG. 4 is a continuous process that may be performed regularly and repeatedly such that the management system 108 has up-to-date data available relating the different elements in the 3D printing system 100.

Figure 5:
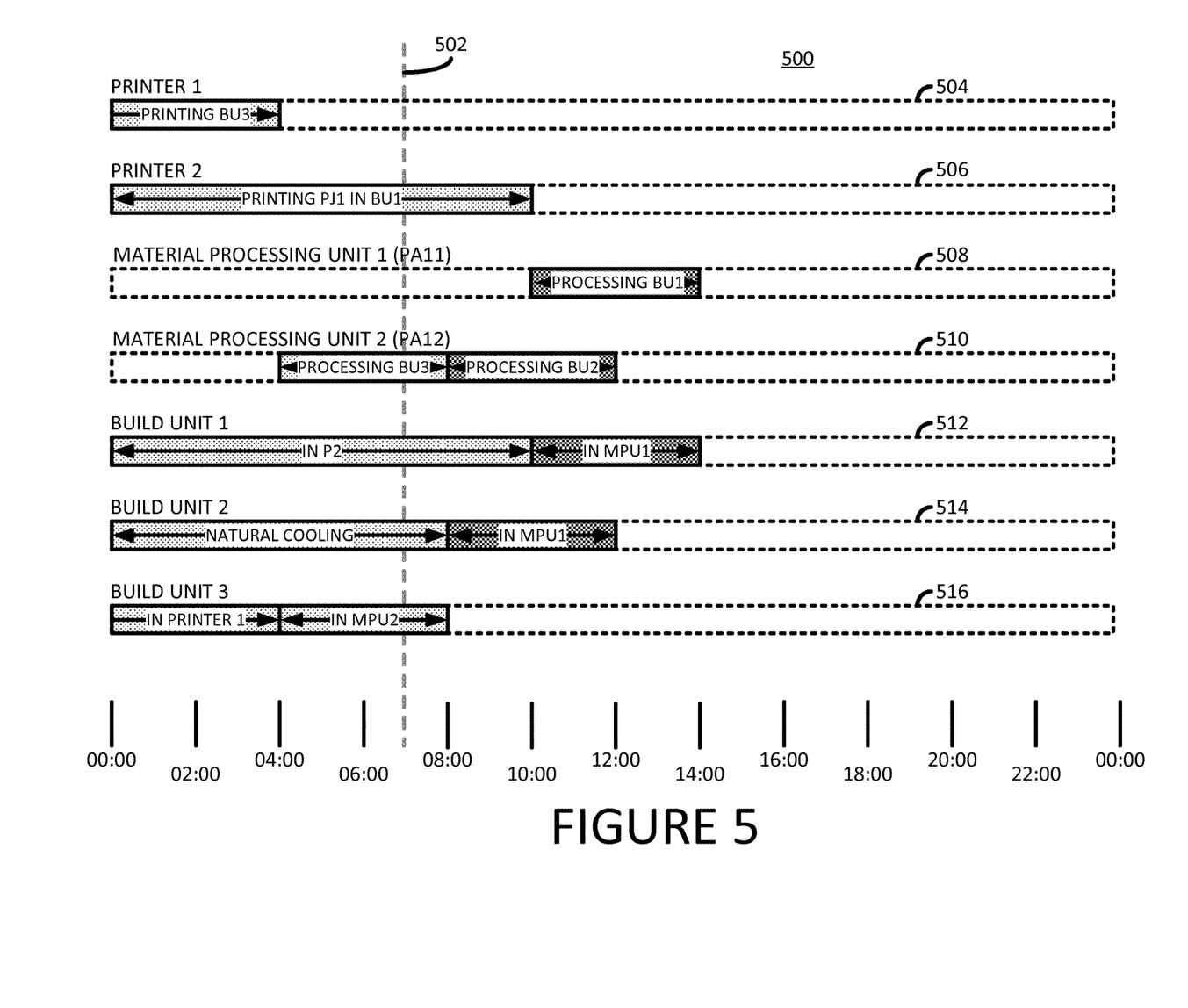
FIG. 5 is an illustration of a generated schedule according to one example.

A more detailed workflow in accordance with the above-described examples will now be described. In this example the 3D printing system 100 comprises two 3D printers 102a and 102b, four build units 106a, 106b, 106c, and 106d, and one material processing unit 104a. FIG. 5 shows an example visualization of a processing schedule 500 previously determined by the management system 108 based on data obtained from elements of the 3D printing system 100.

FIG. 5 shows one row for each of the elements in the 3D printing system 100, with a timeline shown along the x-axis. For example, the first row 504 represents a schedule for a first 3D printer and the second row 506 represents a schedule for a second 3D printer. The third row 508 represents a schedule for a first material processing unit and the fourth row 510 represents a schedule for a second material processing unit. The fifth row 512 represents a schedule for a first build unit, the sixth row 514 represents a schedule for a second build unit, and the seventh row 516 represents a schedule for a third build unit.

Processing operations which are in progress or which have been completed are shown with a light shading, and future scheduled operations are shown with a darker shading. The current time (07:00) is represented by a dashed line 502. Future scheduled operations may be rescheduled by the management system 108 to take into account new print jobs which may be received, or by other changes in the status of elements of the 3D printing system.

A summary of the data shown in the schedule 500 is shown in the tables below:

| ELEMENT (ID) | COMPATIBLE MATERIAL TYPE | STATUS | BUILD UNIT USED | ADDITIONAL DATA |
|---|---|---|---|---|
| PRINTER 1 (P1) | PA11 & PA12 | IDLE | — | — |
| PRINTER 2 (P2) | PA12 & PA12 | PRINTING PJ1 | BU1 | FREE AT: 10:00 |

| ELEMENT (ID) | MATERIAL TYPE | STATUS | ADDITIONAL DATA |
|---|---|---|---|
| MATERIAL PROCESSING UNIT 1 (MPU1) | PA11 | PROCESSING BUILD UNIT 1 | FREE UNTIL: 10:00 |
| MATERIAL PROCESSING UNIT 2 (MPU2) | PA12 | PROCESSING BU3 | FREE AT: 08:00 |

| ELEMENT (ID) | MATERIAL TYPE | STATUS | ADDITIONAL DATA |
|---|---|---|---|
| BUILD UNIT 1 (BU1) | PA11 | IN USE | FREE AT: 14:00 |
| BUILD UNIT 2 (BU2) | PA11 | NATURAL COOLING | FREE AT: 12:00 |
| BUILD UNIT 3 (BU3) | PA12 | IN USE | FREE AT: 08:00 |

| PRINTJOB ID | MATERIAL TYPE | STATUS | OTHER |
|---|---|---|---|
| PJ1 | PA11 | IN PROGRESS | — |

If, at 07:00 a new print job is received (for example at block 404 described above), the management system determines (at block 406) how to schedule the newly received print job into the existing schedule.

| PRINTJOB ID | MATERIAL TYPE | STATUS | OTHER |
|---|---|---|---|
| PJ2 | PA11 | QUEUED | — |

For example, the new print job PJ2 specifies that it is to be printed using PA11 build material, which means that it can only be processed by material processing unit 1 (since material processing unit 2 is configured with PA12 build material). The management system 108 has to determine a build unit to be assigned to the print job PJ2, and as seen in the schedule shown in FIG. 5, the first available build unit is build unit 3, which is free after 08:00.

Figure 6:
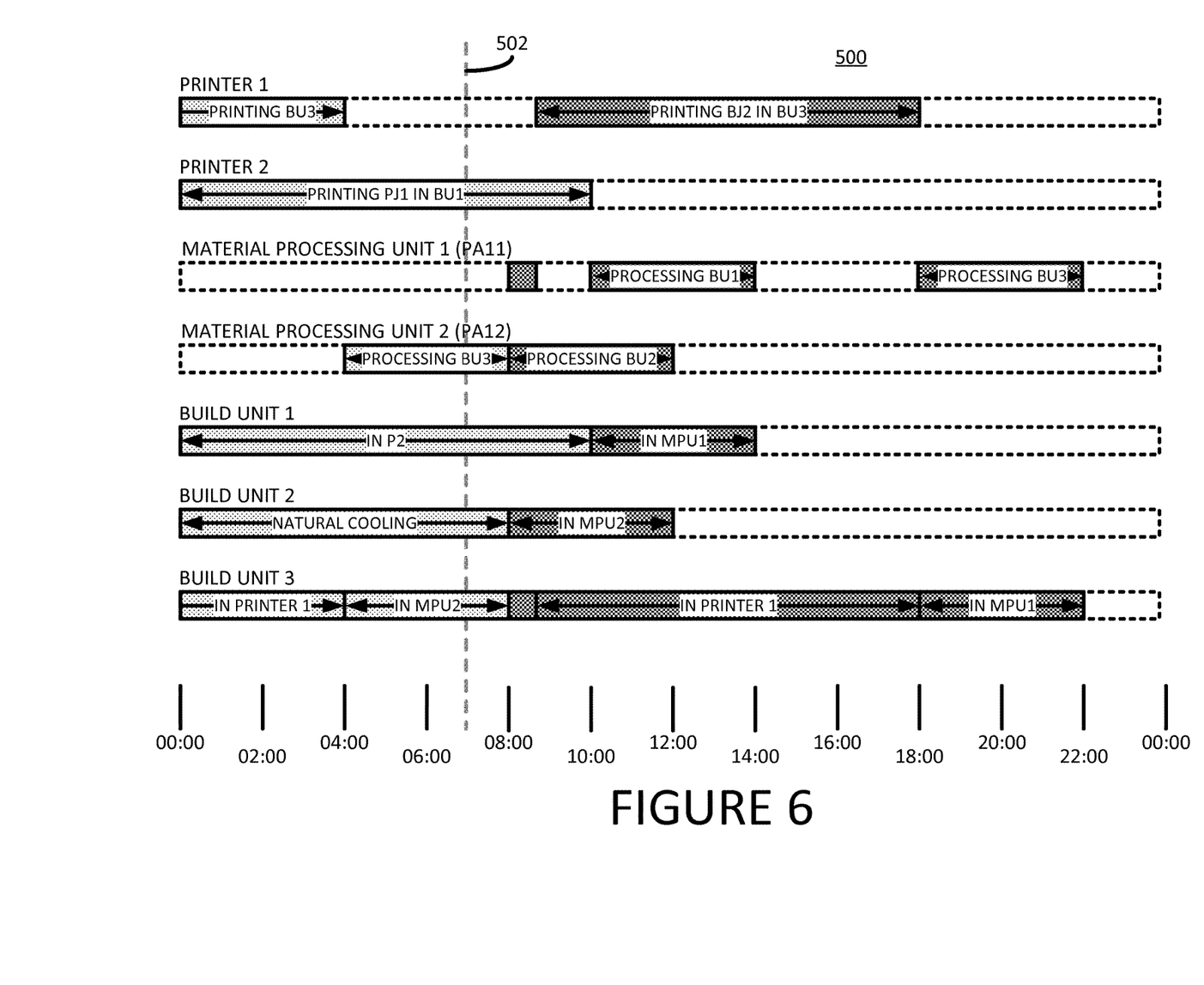
FIG. 6 is an illustration of a generated schedule according to one example.

The management system 108 then determines an updated schedule, as shown in FIG. 6. From this it can be seen that the management system 108 plans for build unit 1 to be loaded with PA11 build material from material processing unit 1, and for the build unit 3 be transferred to printer 1 where printing is expected to finish at 18:00. At 18:00 the management system 108 plans for build unit 1 to be transferred to material processing unit 1, where the build volume can be cooled and the 3D printed objects removed.

The way in which the schedule shown in FIG. 5 and FIG. 6 is determined may be performed in a multitude of ways, using any suitable scheduling algorithms.

In one example, the print job related data includes an urgency or other timing data that may indicate how the print job should be integrated into the current determined schedule. For example, if a newly received print job has a low urgency indicator, the management system 108 may schedule the print job to be executed after all current print jobs in the schedule. If, however, a newly received print job has an urgency higher than other print jobs for which processing has not yet started, the management system 108 may update the determined schedule such that the newly received print job is scheduled to be processed before other print jobs that have a lower priority.

However, at described at block 408, once a suitable schedule has been determined the management system 108 generates control data to allow enforcement of the determined schedule. In one example, the control data is scheduling data relevant to at least the 3D printer system element to which it is sent or made available. For example, the control data sent to the 3D printer 1 may relate to scheduling data relevant only to printer 1, whereas control data sent to material processing unit 1 may relate to scheduling data relevant only to material processing unit 1. In other examples, however, all or other portions of the determined scheduling may be sent or made available to different ones of the 3D printing system elements.

The control data may, for example, be used to control elements of the 3D printing system not to perform operations which are not in accordance with the determined control data. In one example, the control data may include a 3D build unit identifier, an identifier of a 3D printing system element (i.e. either a 3D printer or a material processing unit) intended to process the identified build unit, and a time range during which the identified build unit may be processed by the identified 3D printing system element. In another example, the time range may be replaced by binary indicator generated by the management system 108 indicating whether the identified build unit may be processed at the current time.

For example, if control data sent to material processing unit 1 indicates that at a given time build unit 3 is expected to be processed thereby, it will refuse to operate if build unit 2 is inserted thereinto at that time. By way of another example, if a print job P3 specifies that PA12 build material be used, and that build unit 2 is assigned print job P3, the control data sent to the material processing unit 1 will prevent processing of build unit 2 whilst it is loaded with PA12 build material.

Figure 7:
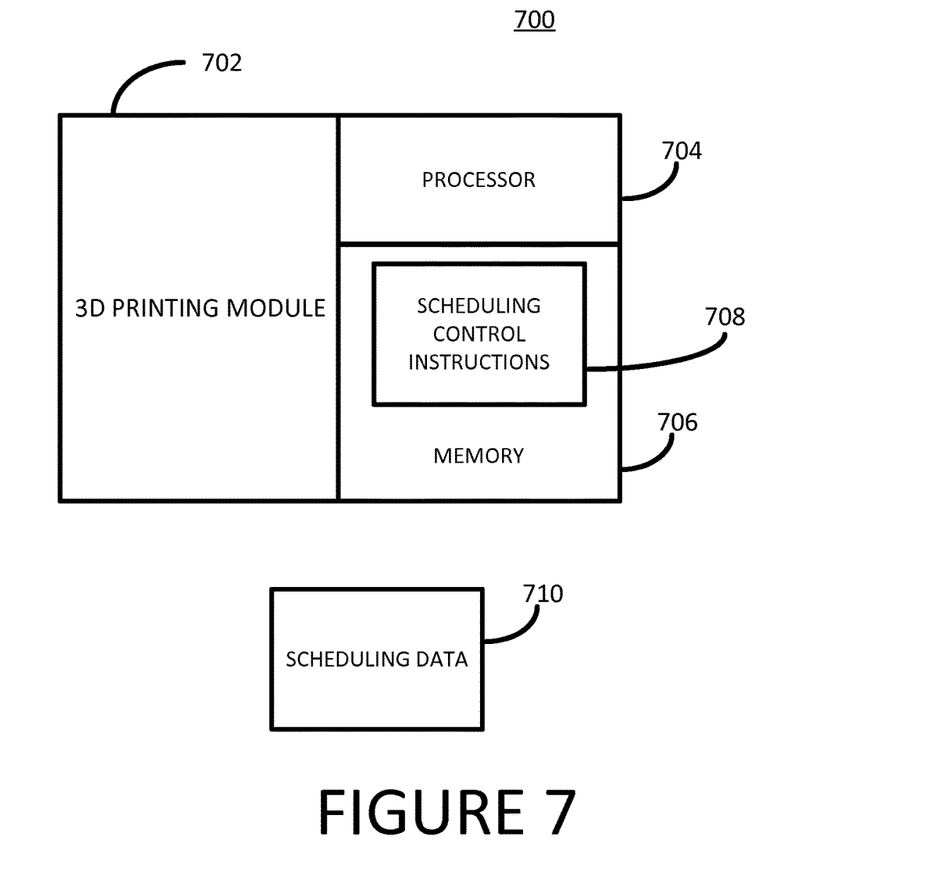
FIG. 7 is a block diagram of a 3D printer according to one example.

An example 3D printer 700 is illustrated in FIG. 7. The 3D printer 700 comprises a suitable 3D printing module 702, and a processor 704, such as a microprocessor, coupled to a memory 706. The memory 706 stores processor understandable scheduling control instructions 708. When executed by the processor 704, the instructions 708 control the 3D printing module 702 according to scheduling data 710. As described above the scheduling data 710 may have been sent to or made available to the 3D printer 700 by management system 108.

Figure 8:
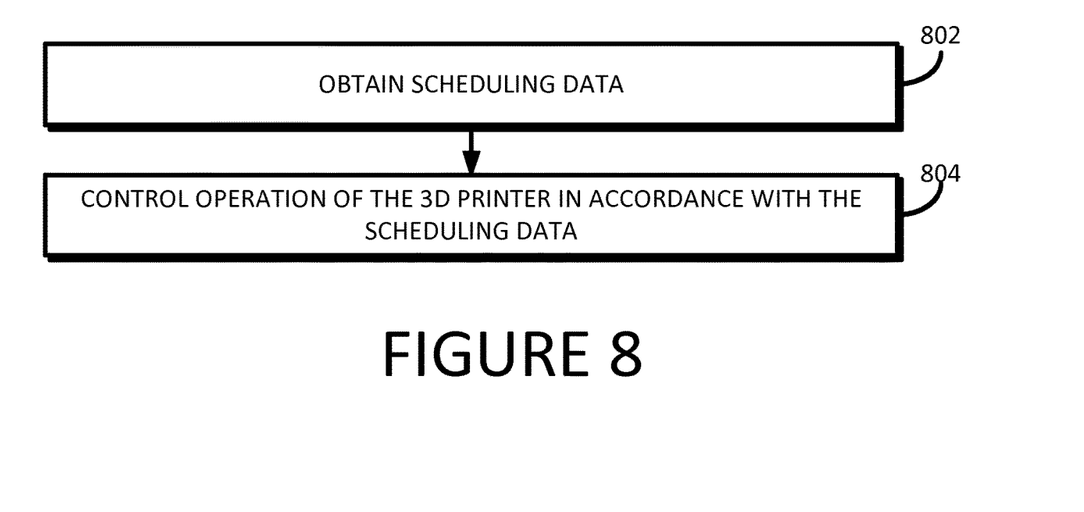
FIG. 8 is a flow diagram outlining an example method of controlling operation of a 3D printer according to scheduling data.

Example operation of the 3D printer 700 is described with further reference to the flow diagram of FIG. 8.

At block 802, the processor 704 executes the scheduling control instructions 708 and obtains scheduling data 710.

At block 804, the processor 704 processes the obtained scheduling data and controls operation of the 3D printer 700 in accordance with the scheduling data, for example as described above. For example, the 3D printer 700 may perform a check against any control data prior to performing any print job on a build unit inserted thereinto to ensure that it is in compliance with any scheduling control data.

Figure 9:
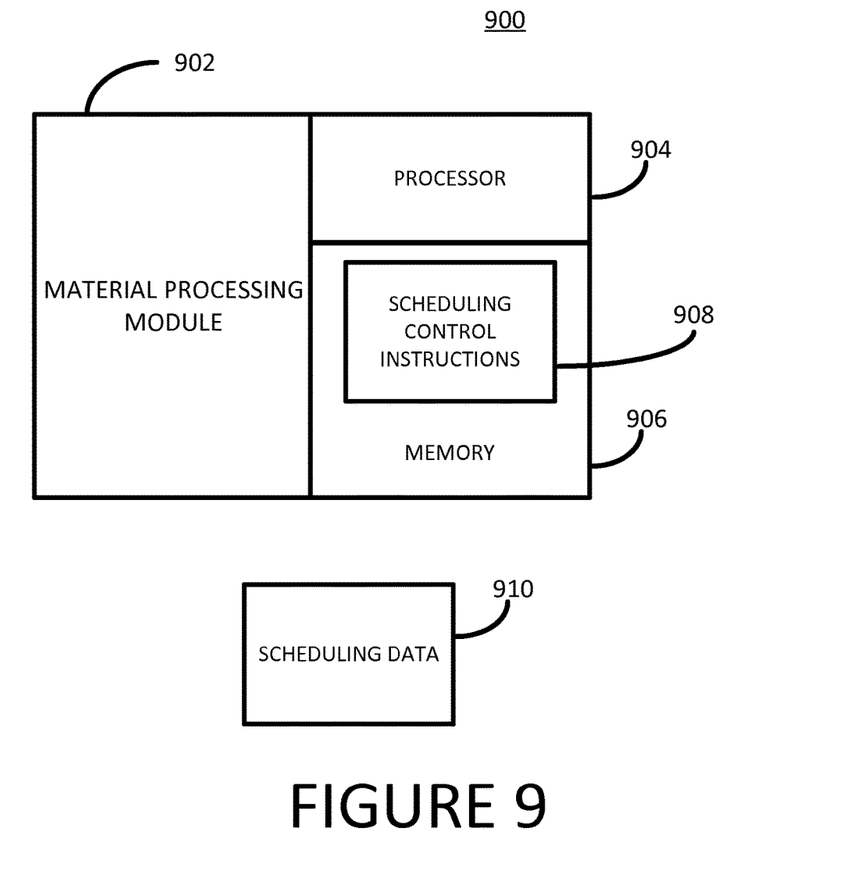
FIG. 9 is a block diagram of a material processing unit according to one example.

An example material processing unit 900 is illustrated in FIG. 9. The material processing unit 900 comprises a suitable material processing module 902, and a processor 904, such as a microprocessor coupled to a memory 906. The memory 904 stores processor understandable scheduling control instructions 908. When executed by the processor 904, the instructions 908 control the material processing module 902 according to scheduling data 910. As described above the scheduling data 910 may have be sent to or made available to the material processing unit 900 by management system 108.

Figure 10:
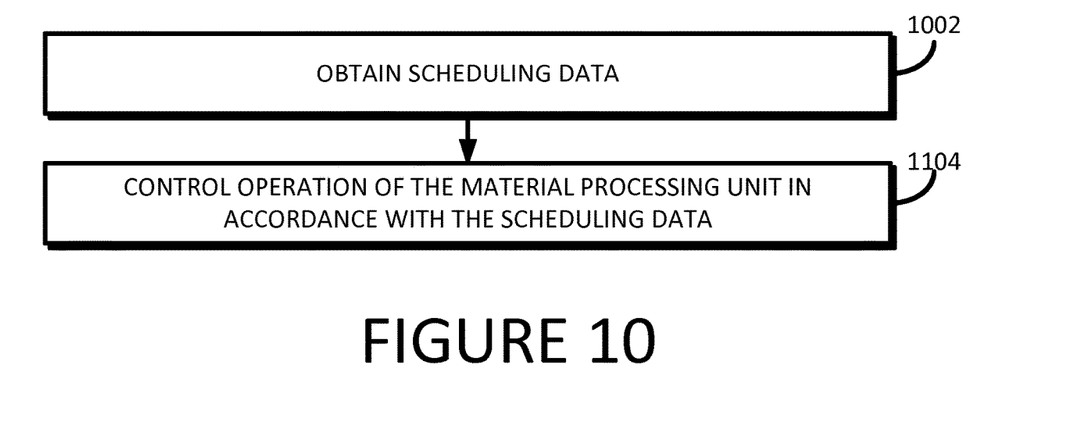
FIG. 10 is a flow diagram outlining an example method of controlling operation of a material processing unit according to scheduling data.

Example operation of the material processing unit 900 is described with further reference to the flow diagram of FIG. 10.

At block 1002, the processor 904 executes the scheduling control instructions 908 and obtains scheduling data 910.

At block 1004, the processor 904 processes the obtained scheduling data and controls operation of the material processing unit 900 in accordance with the scheduling data, for example as described above. For example, the material processing unit 900 may perform a check against any control data prior to processing a build unit inserted thereinto to ensure that it is in compliance with any scheduling control data.

The control of elements of the 3D printing system in this way may be assisted by a visual representation of the determined scheduling, for example displayed on a visual display of a suitable computing device. Furthermore, elements of the 3D printing system may be configured to alert a user, for example using an audible or visual alert, if a user tries to operate elements of the 3D printing system in a way that does not respect the determined scheduling.

Such a management system becomes increasingly important as the complexity and production capacity of 3D printing systems increases. For example, the efficient management of a 3D printing system having multiple 3D printers, multiple build units, and/or multiple material processing units quickly becomes beyond what is manageable by a human operator. Furthermore, such systems may be operated by multiple human operators further complicating the task.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples of the present invention may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A management system to control a 3D printing system including a 3D printer, a build unit in which 3D objects can be generated by the 3D printer, and a material processing unit in which processing operations can be performed on the build unit containing 3D objects generated by the 3D printer, the management system comprising:
    a processor to:
        obtain status data from at least some of the elements of the 3D printing system;
        obtain data relating to a print job to be printed;
        obtain location and status of the build unit as the build unit is inserted into the 3D printer and the material processing unit:
        determine, from the obtained data, a schedule of operations to be performed by elements of the 3D printing system; and
        generate control data to allow enforcement of the determined schedule.

2. The system of claim 1, wherein the processor is to send or make available the generated control data to at least one of: the 3D printer; and the material processing unit.

3. The system of claim 1, wherein the processor obtains print job data and forwards the print job data to a 3D printer in the 3D printing system in accordance with the determined schedule of operations.

4. The system of claim 1, wherein the processor obtains status data relating to the build unit indirectly from one of a 3D printer or a material processing unit.

5. The system of claim 1, wherein the processor obtains status data relating to the build unit from a separate computing device on which status data of the build unit is entered manually.

6. The system of claim 1, wherein the processor obtains status data relating to the build unit directly from the build unit.

7. The system of claim 1, wherein the processor generates control data that includes: an identifier of the build unit, an identifier of either the 3D printer or the material processing unit intended to process the build unit; and an indication of whether the build unit may be used at the current time.

8. The system of claim 1, wherein the processor generates a visualization of the generated schedule on a visual display unit.

9. The system of claim 1, wherein the processor obtains status data from a radio frequency identification (RFID) tag.

10. A method of managing operation of a 3D printing system comprising a 3D printer, a build unit, and a material processing unit; comprising:
    obtaining, with a processor, status data of elements of the 3D printing system, including status data from the build unit;
    obtaining, with the processor, data relating to a first print job to be performed by the 3D printer;
    determining, with the processor, a schedule of operations to be performed by elements of the 3D printing system, wherein the schedule of operations comprise multiple sequential operations performed using the build unit;
    generating, with the processor, control data to allow the 3D printer and the material processing unit to enforce the determined schedule; and
    producing a first object using the 3D printing system, wherein the first object is produced in the build unit when connected to a 3D printer and then processed in the build unit when connected to a material processing unit.

11. The method of claim 10, further comprising making available the generated control data to the 3D printer and the material processing unit to enable enforcement of the determined schedule.

12. The method of claim 10, further comprising obtaining status data of the build unit directly from the build unit.

13. The method of claim 10, further comprising obtaining status data of the build unit indirectly.

14. The method of claim 10, wherein obtaining data relating to a first print job comprises obtaining a print job file, and forwarding it to a 3D printer in accordance with the determined schedule.

15. The method of claim 10, further comprising updating the determined schedule of operations and control data based on obtaining data for a second print job.

16. A 3D printing system comprising a 3D printer, a material processing unit, and multiple build units, wherein the build units interface with the 3D printer and material processing unit, comprising:
    a management system to:
        obtain status data from the 3D printer, build units, and material processing unit;
        obtain data relating to a print job;

determine a schedule of operations from the obtained status data and print job data, wherein the schedule of operations includes multiple sequential operations on a first build unit wherein the first build unit is first associated with a 3D printer and subsequently associated with a material processing unit;

generate 3D printing system element control data based on determined schedule;

make available generated control data to elements of the 3D printing system such that elements of the 3D printing system can enforce the determined schedule of operations;

generate an alert when the first build unit is interfaced with the 3D printer or material processing unit in violation of the control data.

17. The system of claim 16, wherein the generated control data instructs transfer of the first build unit from the 3D printer to the material processing unit.

18. The system of claim 16, wherein the generated control data instructs cooling of the first build unit.

19. The system of claim 16, wherein the first build unit is in the material processing unit and a second build unit is in the 3D printer simultaneously.

20. The system of claim 16, wherein the first build unit is removed from the 3D printer and allowed to cool prior to insertion of the first build unit into the material processing unit.

* * * * *

UNITED STATES PATENT AND TRADEMARK OFFICE
CERTIFICATE OF CORRECTION

PATENT NO. : 10,635,368 B2  
APPLICATION NO. : 16/096355  
DATED : April 28, 2020  
INVENTOR(S) : Anna Torrent et al.

Page 1 of 1

It is certified that error appears in the above-identified patent and that said Letters Patent is hereby corrected as shown below:

On the Title Page

Item (72), 2nd inventor listed, change name from "Marina Ferran Farras" to "Marina Ferran Farres".

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*